United States Patent
Ji et al.

(10) Patent No.: US 9,549,284 B2
(45) Date of Patent: Jan. 17, 2017

(54) APPARATUS AND METHOD FOR CORRECTING LOCATION OF BASE STATION

(71) Applicant: Electronics and Telecommunications Research Institute, Daejeon (KR)

(72) Inventors: Myung-In Ji, Daejeon (KR); Young-Su Cho, Daejeon (KR); Joo-Young Kim, Daejeon (KR); Yang-Koo Lee, Daejeon (KR); Sang-Joon Park, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1 day.

(21) Appl. No.: 14/595,335

(22) Filed: Jan. 13, 2015

(65) Prior Publication Data
US 2015/0201303 A1    Jul. 16, 2015

(30) Foreign Application Priority Data

Jan. 13, 2014  (KR) .......................... 10-2014-0003938

(51) Int. Cl.
*H04W 4/02* (2009.01)
*H04W 4/08* (2009.01)

(52) U.S. Cl.
CPC ................. *H04W 4/02* (2013.01); *H04W 4/08* (2013.01)

(58) Field of Classification Search
CPC ........ H04W 4/02; H04W 24/00; H04W 48/16; H04W 64/00; H04W 88/06
USPC ..................... 455/456.1, 456.2, 456.5, 456.6
See application file for complete search history.

(56) References Cited

U.S. PATENT DOCUMENTS

| 2010/0120422 A1* | 5/2010 | Cheung ................. G01S 5/0226 455/434 |
| 2013/0076562 A1 | 3/2013 | Lee et al. |

FOREIGN PATENT DOCUMENTS

| KR | 1020050063070 A | 6/2005 |
| KR | 1020100120924 A | 11/2010 |
| KR | 1020110111851 A | 10/2011 |

* cited by examiner

*Primary Examiner* — Sam Bhattacharya
(74) *Attorney, Agent, or Firm* — William Park & Associates Ltd.

(57) ABSTRACT

Disclosed herein is an apparatus and method for correcting the location of a base station. The apparatus includes a data collection unit for receiving collected data including collection places and scan data acquired from the collection places from a collection-only terminal, and receiving scan data having no collection places from a user service terminal. A determination unit obtains correlations between respective base stations based on a number of times each base station in an identical search group is found in a search using the collected data or the scan data, and determines whether a base station has been moved, deleted or added, based on the correlations between respective base stations. A location specification unit specifies a location of the corresponding base station that has changed due to any one of the movement, deletion, and addition of the base station, based on results of the determination.

20 Claims, 5 Drawing Sheets

APPARATUS AND METHOD FOR CORRECTING LOCATION OF BASE STATION

CROSS REFERENCE TO RELATED APPLICATION

This application claims the benefit of Korean Patent Application No. 10-2014-0003938, filed Jan. 13, 2014, which is hereby incorporated by reference in its entirety into this application.

BACKGROUND OF THE INVENTION

1. Technical Field

The present invention relates generally to an apparatus and method for correcting the location of a base station and, more particularly, to an apparatus and method for correcting the location of a base station, which analyze and detect whether a wireless communication infrastructure, such as a base station, the location of which is stored in a location database (DB), has been moved or deleted or whether a new base station has been added, by means of scan data transmitted by users, and which utilize the analyzed and detected information for correcting/updating the location DB.

2. Description of the Related Art

Location estimation technologies using wireless communication infrastructures are present in various schemes depending on the type of infrastructures and the range of services. For example, a Global Navigation Satellite System (GNSS) denotes a system for determining a user's location using satellite signals in orbit around the Earth. Similarly, the U.S. Global Positioning System (GPS), Russian Global Navigation Satellite System (GLONASS), European Galileo, etc. are currently operated or are expected to be operated.

Such a GNSS provides a high location precision of about 10 m or less and high availability in a flatland or a suburban area in which a Direct Line of Sight (DLOS) is directly ensured between satellites and a receiver. However, in a congested metropolitan area corresponding to a Non-Line of Sight (NLOS) area, there is a disadvantage in that a location error reaches 50 m due to multi-path errors, and, especially in indoor areas, it is difficult to determine location because reception sensitivity is deteriorated to make it impossible to acquire signals.

Among other wireless communication infrastructures, cellular-based location estimation technology refers to technology for determining the location of a user using the location information and measurement signals of a mobile communication base station. In detail, cellular-based location estimation technology is classified into Cell-ID, Enhanced-Observed Time Difference (E-OTD), Advanced-Forward Link Trilateration (AFLT) depending on the number of base stations from which a terminal device is capable of receiving signals. Due to the characteristics of mobile communication infrastructures having most urban and suburban areas as a service range, cellular-based location estimation technology is advantageous in that the location may be determined even in indoor areas as well as outdoor areas. However, it is difficult to apply such a cellular-based location estimation technology to indoor/outdoor navigation services requiring a location precision of about several meters because the precision of location estimation varies according to the arrangement density of base stations and a relatively low location precision of an average of about 100 to 800 m is implemented.

Assisted-GNSS denotes technology for acquiring assistant information from a location estimation server so as to improve minimum reception signal sensitivity of a GNSS receiver contained in a user terminal device and shorten the initial location determination time (Time to First Fix). Assisted-GNSS enables fast location determination using a GNSS in a congested metropolitan area corresponding to a weak signal environment, but it is impossible to obtain large effects because signal intensity is very low in indoor areas.

Upon estimating location in indoor/outdoor areas, a problem of discontinuous and interrupted communication occurs, and thus methods usable in both indoor and outdoor areas are developed. A representative of those methods is a Wi-Fi-based location estimation technology. Such a Wi-Fi-based location estimation technology may be chiefly classified into a location database (DB)-based technique and a radio map DB-based technique.

A location DB includes information, such as the identifiers, locations, transmission signal intensities, and signal attenuation coefficients of Wi-Fi Access Points (APs) (i.e., base stations) present in a service area. An agent that calculates locations receives such a location DB and estimates locations using a method, such as Cell-ID, triangulation or Weighted Centroid Localization (WCL).

A radio map DB includes information such as base station information, signal intensities, and various types of statistical information that are received from a plurality of preset reference locations within a service area. An agent that calculates locations compares currently found positioning resources with signal intensities or the like recorded in the radio map DB, and estimates a reference location having the most similar information to be a current location.

Generally, the size of a location DB is relatively small in proportion to the number of base stations installed in a service area. In contrast, a radio map DB is larger than a location DB in proportion to the multiplication of the number of constructed reference locations by the number of base stations. Further, upon estimating locations using a radio map DB, all radio maps related to found information must be compared and correlations therebetween must be analyzed, and thus a longer time is required compared to the location DB-based technique.

Meanwhile, upon estimating locations based on a location DB, location precision is directly influenced by the arrangement and number of base stations, and thus a deviation in performance is large. In contrast, generally, when radio map DBs are densely constructed, relatively precise and stable (having less deviation) performance is exhibited.

When a generally constructed location DB representation method is described in the case of, for example, Wi-Fi, the following Table 1 is given.

TABLE 1

| DB item | Example of Wi-Fi |
|---|---|
| Base station unique identifier | MAC address |
| Base station alias | SSID |
| Base station location | Latitude, longitude, and altitude, or latitude, longitude, and floor, or indoor relative X coordinate, indoor relative Y coordinate, and floor, etc. |
| Base station transmission signal intensity | Po (dBm) in Log-distance path-loss model |
| Signal attenuation coefficient | α in Log-distance path-loss model |
| . | . |
| . | . |
| . | . |

Since the location DB includes the location, unique identification number, attribute information, etc. of each base station, a terminal may estimate the location using a Cell-ID technique, a triangulation technique, a Weighted Centroid Localization (WCL) technique, or the like by exploiting the included DB information.

For example, when location is estimated using the Cell-ID technique, a location corresponding to a base station having the largest signal intensity, among found base stations (or infrastructures), is determined to be the current location of a terminal.

When location is estimated using the triangulation technique, three or more base stations are selected from among found base stations, signal intensities are converted (estimated) into distances, and the current location of a terminal is calculated using a Least Square method (LSM) or the like.

When location is estimated using the WCL technique, the intensities of signals received from respective base stations are compared with each other using all or some of found base stations, and weights are assigned to the signal intensities, and thus the current location of a terminal is calculated.

If the actual location of a base station has changed due to the influence of various environmental factors, but it is not reflected in the location DB, a large error may occur in the results of the location estimation of the terminal even if any of the above-described location DB-based location estimation methods is used.

Meanwhile, a wireless communication base station, such as a Wi-Fi Access Point (AP), that has short radio coverage and that can be easily installed and removed by a user, may exhibit a frequent change in location with the elapse of time. Accordingly, the location DB in which such information is recorded must be able to desirably reflect such an environmental change. Generally, in order to construct a location DB, radio information, collection locations, etc. must be collected and processed in given areas. However, frequently performing collection/analysis tasks to maintain the location DB in the latest status results in a great waste of time and cost.

As related preceding technology, Korean Patent Application Publication No. 2011-0111851 (entitled "Method of Automatic Registration of Wireless AP") discloses technology for compensating for the deterioration of precision in location determination due to the information of a moved AP after an AP information map has been constructed, and for continuously improving precision.

As another related preceding technology, there is Korean Patent Application Publication No. 2010-0120924 (entitled "Method and System for Renewal of AP Location Information using Wireless LAN Terminal, and Wireless LAN Terminal therefor"). This patent discloses technology that automatically updates erroneous location information attributable to the location information of a wireless Local Area Network (LAN) AP that is newly installed and the movement of installation locations of previously registered wireless LAN APs, in the DB of a wireless LAN AP location management system via the wireless LAN terminal of a user, thus reducing cost and time required for update after the location information DB of the wireless LAN AP has been initially constructed, with the result that the quality of a wireless LAN-based location information service can be improved.

As further related preceding technology, there is provided Korean Patent Application Publication No. 2005-0063070 (entitled "Apparatus and method of management of wireless AP for enterprise"). This patent discloses technology that, when a communication service provider provides an enterprise wireless LAN service, periodically receives the information of APs installed in a business workplace, immediately updates information required for authentication agency, and periodically checks whether each AP is normally operated so as to process authentication agency of an enterprise wireless LAN and fault management thereof, so that an AP authentication agency service may be favorably processed and AP faults may be immediately repaired, thus supporting the improvement of wireless LAN services for enterprise customers.

SUMMARY OF THE INVENTION

Accordingly, the present invention has been made keeping in mind the above problems occurring in the prior art, and an object of the present invention is to provide an apparatus and method for correcting the location of a base station, which analyze and detect whether a wireless communication base station, the location of which has been previously estimated and stored in a location DB, has been moved or deleted and whether a new base station has been added, by means of scan data transmitted by users, and which utilize the detected information for correcting/updating the location DB.

In accordance with an aspect of the present invention to accomplish the above object, there is provided an apparatus for correcting a location of a base station, including a data collection unit for receiving collected data including collection places and scan data acquired from the collection places from a collection-only terminal, and receiving scan data having no collection places from a user service terminal; a determination unit for obtaining correlations between respective base stations based on a number of times each base station in an identical search group is found in a search using the collected data or the scan data, and determining whether a base station has been moved, deleted or added, based on the correlations between respective base stations; and a location specification unit for specifying a location of the corresponding base station that has changed due to any one of the movement, deletion, and addition of the base station, based on results of the determination by the determination unit.

The correlations between respective base stations may be represented by values of correlation coefficients, and the determination unit may determine whether the corresponding base station has been added or deleted, using a change in a value of a corresponding correlation coefficient.

The correlations between respective base stations may be represented by values of correlation coefficients, and the determination unit may determine whether the corresponding base station has been deleted, using both a value of a corresponding correlation coefficient and information about time at which the base station was finally found.

The correlations between respective base stations may be represented by values of correlation coefficients, and the determination unit may determine whether the corresponding base station has been moved, using a configuration of a new identical search group and a change in a value of a corresponding correlation coefficient.

The location specification unit may be configured to, if it is determined by the determination unit that the base station has been newly added and if location information of the added base station is not known, specify a location of a base station having a high correlation coefficient, among previously constructed base stations, as a location of the newly added base station.

The location specification unit may be configured to, if it is determined by the determination unit that the base station has been newly added and if location information of the added base station is not known, estimate a location of the added base station using information of a previously constructed location database (DB), and specify the estimated location as a location of the newly added base station.

The location specification unit may be configured to, if it is determined by the determination unit that the base station has been newly added and if location information of the added base station is known, specify the location information as a location of the newly added base station.

The location specification unit may be configured to, if it is determined by the determination unit that the base station has been moved and if location information of the moved base station is not known, specify a location of a base station having a high correlation coefficient, among previously constructed base stations, as a location of the moved base station.

The location specification unit may be configured to, if it is determined by the determination unit that the base station has been moved and if location information of the moved base station is not known, estimate a location of the moved base station using information of a previously constructed location DB, and specify the estimated location as a location of the moved base station.

The location specification unit may be configured to, if it is determined by the determination unit that the base station has been moved and if location information of the moved base station is known, specify the location information as a location of the moved base station.

In accordance with another aspect of the present invention to accomplish the above object, there is provided a method for correcting a location of a base station, including receiving, by a data collection unit, collected data including collection places and scan data acquired from the collection places from a collection-only terminal, and scan data having no collection places from a user service terminal; obtaining, by a determination unit, correlations between respective base stations based on a number of times each base station in an identical search group is found in a search using the collected data or the scan data; determining, by the determination unit, whether a base station has been moved, deleted or added, based on the correlations between respective base stations; and specifying, by a location specification unit, a location of the corresponding base station that has changed due to any one of the movement, deletion, and addition of the base station, based on results of the determination.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
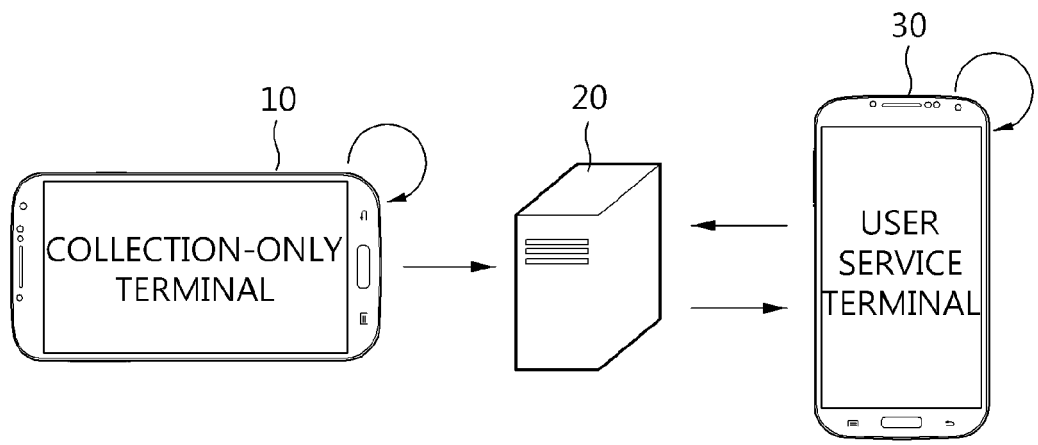
FIG. 1 is a configuration diagram of a system employing an apparatus for correcting the location of a base station according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

In the following specification, the term "wireless communication infrastructure" may be regarded as meaning a base station.

FIG. 1 is a configuration diagram of a system employing an apparatus for correcting the location of a base station according to an embodiment of the present invention.

The system of FIG. 1 includes a collection-only terminal 10, a location DB server 20, and a user service terminal 30.

The collection-only terminal 10 collects signals from wireless communication infrastructures along any path or location in a service area in which a location DB is to be constructed. Targets collected by the collection-only terminal 10 include collection places and scan data scanned in the corresponding collection places. The collection-only terminal 10 transmits collected data (that is, collection places and scan data scanned in the corresponding collection places) to the location DB server 20.

The location DB server 20 receives the collected data from the collection-only terminal 10, processes the collected data, constructs a location DB from the processed data, and stores the location DB in its own DB.

The user service terminal 30 scans surrounding wireless communication infrastructure signals and transfers the signals to the location DB server 20. Accordingly, the user service terminal 30 may be provided with a location DB for the corresponding location from the location DB server 20. The user service terminal 30 may calculate its own location with a method, such as a Cell-ID technique, a triangulation technique, or a WCL technique, using the received location DB.

The location DB server 20 receives the collected data from the collection-only terminal 10, and receives the scan data from the user service terminal 30. Generally, as a wireless communication infrastructure is located closer or guarantees a Line-of Sight (LOS), a probability that the wireless communication infrastructure will be found is increased upon attempting each search. Further, as collection locations or scan locations become various and the number of the locations becomes larger, the precision of the probability is increased.

Therefore, the location DB server 20 may be regarded as collecting wireless communication infrastructure signals using collected data and scan data. Here, the collected data denotes collection places acquired by the collection-only terminal 10 or the like and scan data acquired from the places so as to construct the location DB of wireless communication infrastructures. In this case, the collected places are location coordinates personally entered by a collector or obtained using Pedestrian Dead Reckoning (PDR) or the like. The scan data denotes data scanned by the user service terminal 30. Since the user service terminal 30 is not a collection device, scan data does not contain collection places.

The above two types of data are summarized as follows.

collected data={collection places+scan data acquired from collection places}  ① scan data={scan data}  ②

In this way, since the collected data contains collection places, it may be utilized for estimating the location of each base station and constructing the location DB. However, since the scan data contains only the unique ID information and signal intensities of a found base station, it cannot be utilized for precisely estimating the location of each base station.

Meanwhile, the location DB server 20 constructs (generates) a correlation coefficient matrix for an identical search group using the collected data or scan data. Here, the term "identical search group" may be defined as a set of wireless communication infrastructures found together in the search in a specific place. A method of constructing a correlation coefficient matrix for an identical search group will be described in detail later. Further, the location DB server 20 performs the determination of whether a wireless communication infrastructure has been deleted, has been newly added, or has been moved, using the constructed correlation coefficient matrix. The determination of whether a wireless communication infrastructure has been deleted, has been newly added, or has been moved will be described in greater detail later.

Figure 2:
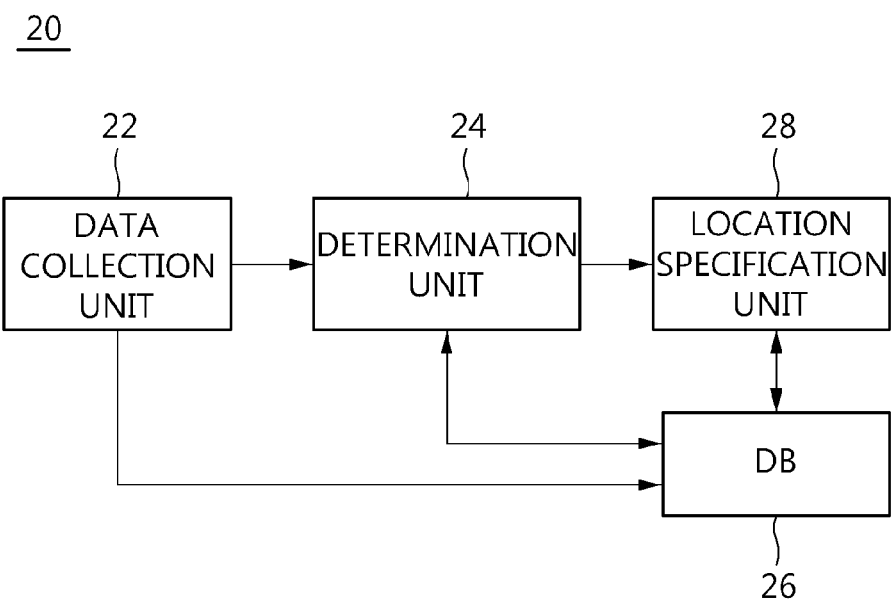
FIG. 2 is a diagram showing the internal configuration of the apparatus for correcting the location of a base station according to an embodiment of the present invention.

FIG. 2 is a diagram showing the internal configuration of an apparatus for correcting the location of a base station according to an embodiment of the present invention. Actually, the location DB server 20 shown in FIG. 1 may be the apparatus for correcting the location of a base station according to the embodiment of the present invention.

The location DB server 20 includes a data collection unit 22, a determination unit 24, a database (DB) 26, and a location specification unit 28.

The data collection unit 22 collects collected data from the collection-only terminal 10, and collects scan data from the user service terminal 30. The data collection unit 22 may temporarily store the collected data and the scan data, or store the collected data and the scan data in the DB 26.

The determination unit 24 obtains correlations between respective wireless communication infrastructures based on the number of times that each wireless communication infrastructure in an identical search group is found in a search using the collected data or the scan data, and determines whether a wireless communication infrastructure has been moved, deleted or added, based on the correlations between respective wireless communication infrastructures. That is, the determination unit 24 generates a correlation coefficient matrix based on the identical search group by using the collected data or scan data. Further, the determination unit 24 may determine whether a wireless communication infrastructure has been deleted, using the generated correlation coefficient matrix. Furthermore, the determination unit 24 may determine whether a wireless communication infrastructure may be newly added, using the generated correlation coefficient matrix. Furthermore, the determination unit 24 may determine whether a wireless communication infrastructure has been moved, using the generated correlation coefficient matrix.

In other words, the determination unit 24 may determine that a wireless communication infrastructure has been added or deleted, using a change in the value of the correlation coefficient. Alternatively, the determination unit 24 may determine that a wireless communication infrastructure has been deleted, using both the value of a correlation coefficient and information about time at which a wireless communication infrastructure was finally found in the search. Meanwhile, the determination unit 24 may determine that a wireless communication infrastructure has been moved, using both the configuration of a new identical search group and a change in the value of a correlation coefficient.

The DB 26 previously stores a location DB containing the location information of each wireless communication infrastructure (e.g., a base station), the location of which has already been estimated. Here, the base station location DB may be classified using a method of directly inputting the installation location of each base station or a method of analyzing and estimating signal data or the like collected by a collection device. The base station location DB may include, but is not limited to, the location of each base station, the unique ID number of the base station, the attribute information such as the signal transmission intensity of the base station, etc. Meanwhile, a method of searching for the location of a base station based on estimation may be sufficiently understood by those skilled in the art from known technology.

In particular, the base station location DB of the DB 26 may be regarded as additionally including collected data, scan data, and a correlation coefficient matrix for an identical search group, in addition to the location of each base station, the unique ID number of the base station, and attribute information such as the signal transmission intensity of the base station.

The location specification unit 28 may specify (indicate or mark) the location of a wireless communication infrastructure that has been changed due to any one of movement, deletion, and addition depending on the results of determination by the determination unit 24. The location information of the wireless communication infrastructure specified by the location specification unit 28 may be stored in the DB 26.

In other words, the location specification unit 28 is configured to, if it is determined by the determination unit 24 that a wireless communication infrastructure has been newly added and if the location information of the wireless communication infrastructure is not known, specify the location of a wireless communication infrastructure having a high correlation coefficient, among previously constructed wireless communication infrastructures, as the location of the newly added wireless communication infrastructure. Alternatively, the location specification unit 28 is configured to, if it is determined by the determination unit 24 that a wireless communication infrastructure has been newly added and if the location information of the wireless communication infrastructure is not known, estimate the location of the newly added wireless communication infrastructure using the information of a previously constructed location DB, and specify the estimated location as the location of the newly added wireless communication infrastructure. Meanwhile, the location specification unit 28 is configured to, if it is determined by the determination unit 24 that a wireless communication infrastructure has been newly added and if the location information of the wireless communication infrastructure is known, specify the known location information as the location of the newly added wireless communication infrastructure. Meanwhile, the location specification unit 28 is configured to, if it is determined by the determination unit 24 that a wireless communication infrastructure has been moved and if the location information of the wireless communication infrastructure is not known, specify the location of a wireless communication infrastructure having a high correlation coefficient, among previously constructed wireless communication infrastructures, as the location of the moved wireless communication infrastructure. Alternatively, the location specification unit 28 is configured to, if it is determined by the determination unit 24 that a wireless communication infrastructure has been moved and if the location information of the wireless communication infrastructure is not known, estimate the location of the moved wireless communication infrastructure using the information of a previously constructed location DB and specify the estimated location as the location of the moved wireless communication infrastructure. Meanwhile, the location specification unit 28 is configured to, if it is determined by the determination unit 24 that the wireless communication infrastructure has been moved and if the location information of the wireless communication infrastructure is known, specify the known location information as the location of the moved wireless communication infrastructure.

In this way, as a wireless communication infrastructure is deleted, added or moved, the location specification unit 28 specifies the location corresponding thereto, and thus corrects/updates the location DB.

Figure 3A:
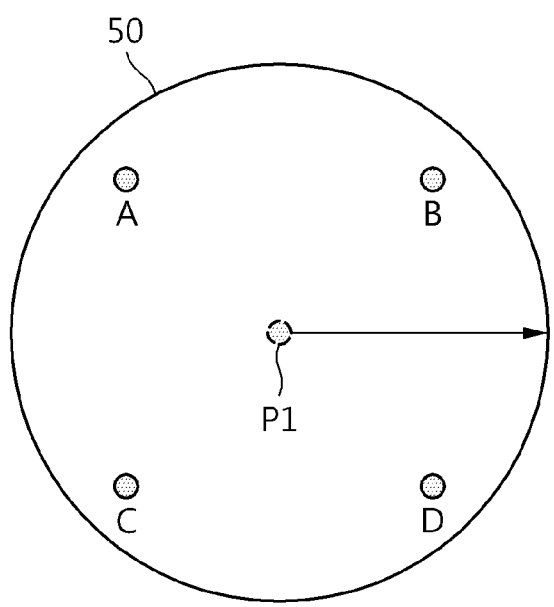
FIGS. 3A to 3C are diagrams showing examples of search results when a search is performed at different locations in an environment in which four base stations are present.
Figure 3B:
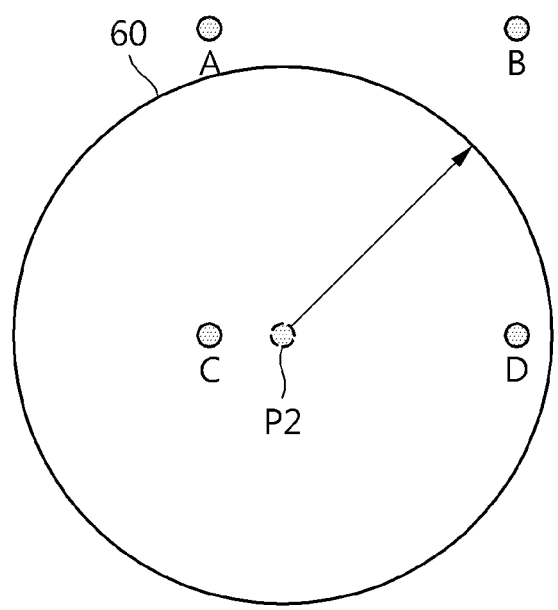
Figure 3C:
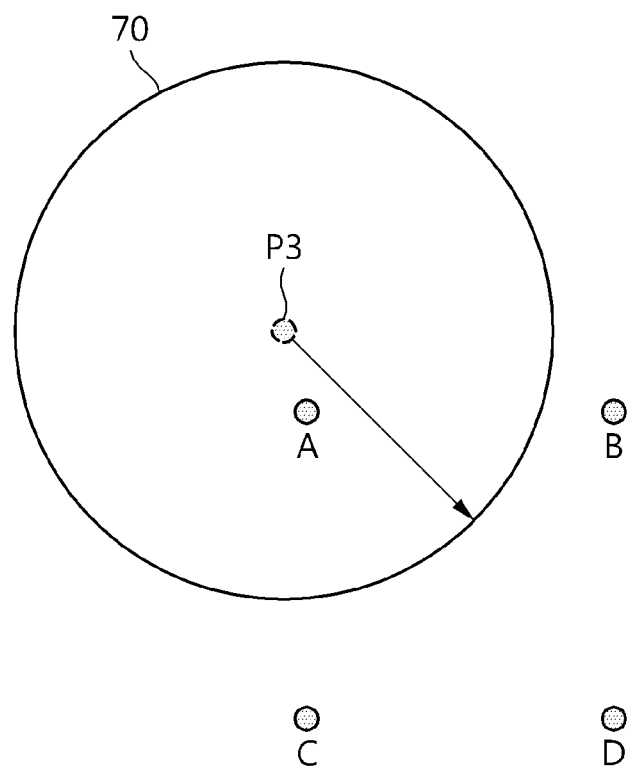

FIGS. 3A to 3C are diagrams showing examples of search results when a search is performed at different locations in an environment in which four wireless communication infrastructures (base stations) are present. The drawings are employed to describe a method of constructing a correlation coefficient matrix using collected data or scan data in the determination unit 24.

In FIG. 3A, when a search is performed at the center P1 of wireless communication infrastructure locations (50), four wireless communication infrastructures A, B, C, and D are found in the search. In FIG. 3B, when a search is performed near the wireless communication infrastructure C (60), only two wireless communication infrastructures C and D are found in the search due to limited radio converge. In FIG. 3C, when a search is performed near the wireless communication infrastructure A (70), only one wireless communication infrastructure A is found in the search due to limited radio coverage.

This means that, according to the location of the search, the number and type of found wireless communication infrastructures may vary. In FIGS. 3A, 3B, and 3C, P1, P2, and P3 respectively denote the locations of the search.

When a correlation coefficient is defined as a probability that the wireless communication infrastructure B will be found in the search when the wireless communication infrastructure A is found, an equation for obtaining the correlation coefficient may be represented by the following equation:

correlation coefficient=(total number of times infrastructure $B$ is found together when infrastructure $A$ is found)/(total number of times infrastructure $A$ is found)

According to the above equation, when the results of the search performed three times in FIGS. 3A, 3B, and 3C are represented by a correlation coefficient matrix, the following Table 2 (example in which the results of FIGS. 3A, 3B, and 3C are converted into correlation coefficients) is given.

TABLE 2

|   | A | B | C | D |
|---|---|---|---|---|
| A | 1 | 0.5 | 0.5 | 0.5 |
| B | 1 | 1 | 1 | 1 |
| C | 0.5 | 0.5 | 1 | 1 |
| D | 0.5 | 0.5 | 1 | 1 |

The meanings of Table 2 are given by the following Table 3 (meaning of each cell in Table 2).

TABLE 3

|   | A | B | C | D |
|---|---|---|---|---|
| A | When infrastructure A is found, (total number of times infrastructure A is found together)/(total number of times infrastructure A is found) | When infrastructure A is found, (total number of times infrastructure B is found together)/(total number of times infrastructure A is found) | When infrastructure A is found, (total number of times infrastructure C is found together)/(total number of times infrastructure A is found) | When infrastructure A is found, (total number of times infrastructure D is found together)/(total number of times infrastructure A is found) |
| B | When infrastructure B is found, (total number of times infrastructure A is found together)/(total number of times infrastructure B is found) | When infrastructure B is found, (total number of times infrastructure B is found together)/(total number of times infrastructure B is found) | When infrastructure B is found, (total number of times infrastructure C is found together)/(total number of times infrastructure B is found) | When infrastructure B is found, (total number of times infrastructure D is found together)/(total number of times infrastructure B is found) |

TABLE 3-continued

| A | B | C | D |
|---|---|---|---|
| C When infrastructure C is found, (total number of times infrastructure A is found together)/(total number of times infrastructure C is found) | When infrastructure C is found, (total number of times infrastructure B is found together)/(total number of times infrastructure C is found) | When infrastructure C is found, (total number of times infrastructure C is found together)/(total number of times infrastructure C is found) | When infrastructure C is found, (total number of times infrastructure D is found together)/(total number of times infrastructure C is found) |
| D When infrastructure D is found, (total number of times infrastructure A is found together)/(total number of times infrastructure D is found) | When infrastructure D is found, (total number of times infrastructure B is found together)/(total number of times infrastructure D is found) | When infrastructure D is found, (total number of times infrastructure C is found together)/(total number of times infrastructure D is found) | When infrastructure D is found, (total number of times infrastructure D is found together)/(total number of times infrastructure D is found) |

In this way, as the search locations become various, and as the number of searches becomes larger, Table 2 and Table 3 have the following features:

① Infrastructures located close to each other have a high probability of being found together in the search, and thus they have a high correlation coefficient.

② Infrastructures located far away from each other have a low probability of being found together in the search, and thus they have a low correlation coefficient.

Below, a method in which the determination unit 24 performs the determination of whether a wireless communication infrastructure has been deleted, has been newly added, or has been moved, using a correlation coefficient matrix, will be described in detail.

1) Determination of Whether a Wireless Communication Infrastructure has been Deleted (Removed from a Previous Location)

A correlation coefficient may be utilized as a criterion for determining whether a wireless communication infrastructure has been deleted, with reference to "time at which a specific infrastructure was finally found" or the like. In the example of Table 2, the correlation coefficients of the wireless communication infrastructures C and D are 1. This means that, when the wireless communication infrastructure C is found in the search, the wireless communication infrastructure D is always found together with C. In information about "time at which a specific infrastructure was finally found," when the wireless communication infrastructure C was found yesterday, and the wireless communication infrastructure D was found two weeks ago, it may be determined that the wireless communication infrastructure D that was always found together with the wireless communication infrastructure C was moved or was deleted.

Alternatively, it may be determined whether a wireless communication infrastructure has been deleted, using a change in the value of a correlation coefficient for each time. In the example of Table 2, the correlation coefficients of the wireless communication infrastructures C and D are 1. However, when the wireless communication infrastructure C is continuously found in the search, and the wireless communication infrastructure D is not found, the values of the correlation coefficients will be gradually lowered. That is, after a predetermined time has elapsed, when the correlation coefficients are compared with each other, it may be determined whether the corresponding wireless communication infrastructure has been deleted if a difference between the correlation coefficients is a predetermined value or more.

2) Determination of Whether a Wireless Communication Infrastructure has been Newly Added If one or more wireless communication infrastructures are added, and a new identical search group is configured, the column information of a correlation coefficient matrix is also added in conformity with the addition of the wireless communication infrastructure. Further, in the case of a continuously found wireless communication infrastructure rather than a temporarily found wireless communication infrastructure, the value of the correlation coefficient for the wireless communication infrastructure is increased. By means of comparison of the change in the identical search group and the change in the value of the correlation coefficient, it may be determined that a new wireless communication infrastructure has been added.

3) Determination of Whether a Wireless Communication Infrastructure has been Moved (Transferred from an Existing Location to Another Location)

The movement of a wireless communication infrastructure may be determined when a specific wireless communication infrastructure deviates from the range of its identical search group to which the specific wireless communication infrastructure belongs, and then belongs to another identical search group. This shows that, as a successive action of the above-described determination of whether a wireless communication infrastructure has been newly added and the determination of whether the wireless communication infrastructure has been deleted. In this case, infrastructure information is added to the location DB of a region in which a new identical search group is configured and the value of a correlation coefficient is increased, and infrastructure information is deleted from the location DB of a region in which the value of a correlation coefficient is decreased, and thus infrastructure information is reflected.

When the determination of new addition or movement in the above-described items 2) and 3) has been performed, there is a limitation in precisely determining the location of a wireless communication infrastructure if only scan data is used. In this case, the location of a newly added wireless communication infrastructure may be specified by re-estimating the location of the wireless communication infrastructure using collected data or by referring to the location of a wireless communication infrastructure having a high correlation coefficient, among previously constructed wireless communication infrastructures.

If the location of a newly added infrastructure or a moved infrastructure is known, this location is specified as the newly added location or moved location.

Figure 4:
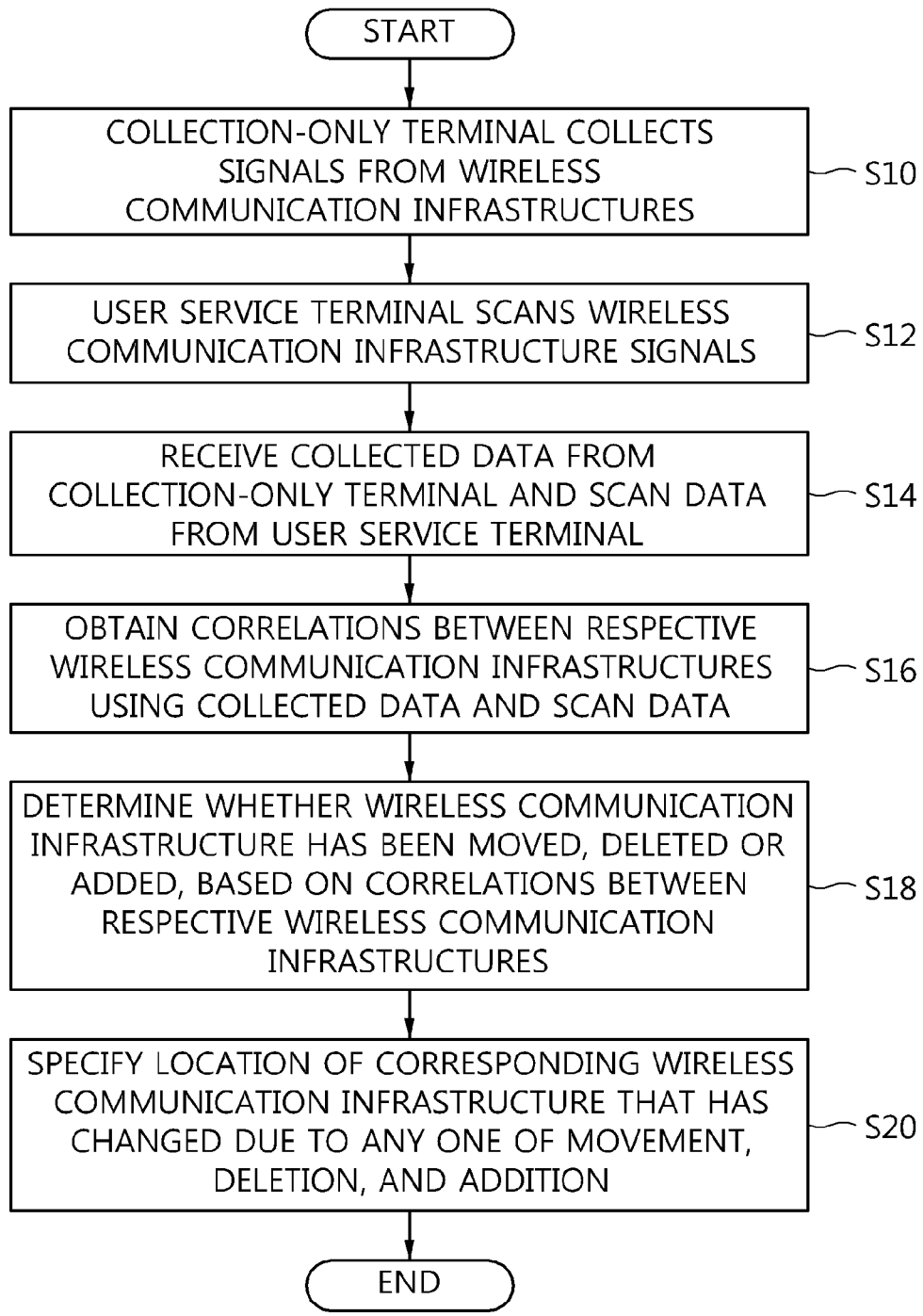
FIG. 4 is a flowchart showing a method for correcting the location of a base station according to an embodiment of the present invention.

FIG. 4 is a flowchart showing a method for correcting the location of a wireless communication infrastructure (base station) according to an embodiment of the present invention.

First, the collection-only terminal 10 collects signals from wireless communication infrastructures along any path or place in a service area in which a location DB will be constructed at step S10. The collection-only terminal 10 transmits collected data (that is, collection places and scan data scanned in the corresponding collection places) to the location DB server 20.

Further, the user service terminal 30 scans surrounding wireless communication infrastructure signals as scan data at step S12. The user service terminal 30 transfers the scan data to the location DB server 20.

Accordingly, the location DB server 20 receives the collected data from the collection-only terminal 10 and receives the scan data from the user service terminal 30 at step S14.

Thereafter, the location DB server 20 obtains correlations between respective wireless communication infrastructures (that is, a correlation coefficient matrix for an identical search group) using the collected data or scan data at step S16.

Then, the location DB server 20 determines whether a wireless communication infrastructure has been moved, deleted or added, based on the correlations between respective wireless communication infrastructures, at step S18.

Depending on the results of determination, the location DB server 20 specifies the location of the corresponding wireless communication infrastructure, which has changed due to any one of movement, deletion, and addition, at step S20.

In order to estimate the location of the terminal, it is more important to precisely estimate the location of a base station that is a reference. However, even if the location of the base station is precisely constructed, when the base station is moved or deleted, the reliability of the location DB is deteriorated, and the precision of the estimated location of the terminal is also decreased.

Therefore, as described above, it is very important to implement technology for continuously detecting a change in each base station and maintaining the latest location DB, as well as technology for estimating the location of each base station and constructing a DB from the location. In relation to this, the present invention may detect the addition/movement/deletion of a base station by adding a portion for reflecting a change in the location of the base station to conventional technology.

In accordance with the present invention having the above configuration, a portion for reflecting a change in the location of each base station is added, thus enabling the addition/movement/deletion of a base station to be detected.

In particular, a correlation coefficient matrix for an identical search group in the present invention may be constructed using not only collected data, but also scan data containing no collection places, and thus the present invention may be utilized under various scenarios. That is, using only scan data delivered by a terminal service user, the addition/movement/deletion of each wireless communication infrastructure (base station) may be continuously detected, and thus the range of utilization of the present invention may be regarded as wide.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for correcting a location of a base station, comprising:

a data collection unit for receiving collected data including collection places and scan data acquired from the collection places from a collection-only terminal, and receiving scan data having no collection places from a user service terminal;

a determination unit for obtaining correlations between respective base stations based on a number of times each base station in an identical search group is found in a search using the collected data or the scan data, and determining whether a base station has been moved, deleted or added, based on the correlations between respective base stations; and a location specification unit for specifying a location of the corresponding base station that has changed due to any one of the movement, deletion, and addition of the base station, based on results of the determination by the determination unit, wherein the collection-only terminal and the user service terminal are separate terminals that are configured to separately provide their respective data to the data collection unit.

2. The apparatus of claim 1, wherein: the correlations between respective base stations are represented by values of correlation coefficients, and the determination unit determines whether the corresponding base station has been added or deleted, using a change in a value of a corresponding correlation coefficient.

3. The apparatus of claim 1, wherein: the correlations between respective base stations are represented by values of correlation coefficients, and the determination unit determines whether the corresponding base station has been deleted, using both a value of a corresponding correlation coefficient and information about time at which the base station was finally found.

4. The apparatus of claim 1, wherein: the correlations between respective base stations are represented by values of correlation coefficients, and the determination unit determines whether the corresponding base station has been moved, using a configuration of a new identical search group and a change in a value of a corresponding correlation coefficient.

5. The apparatus of claim 1, wherein the location specification unit is configured to, if it is determined by the determination unit that the base station has been newly added and if location information of the added base station is not known, specify a location of a base station having a high correlation coefficient, among previously constructed base stations, as a location of the newly added base station.

6. The apparatus of claim 1, wherein the location specification unit is configured to, if it is determined by the determination unit that the base station has been newly added and if location information of the added base station is not known, estimate a location of the added base station using information of a previously constructed location database (DB), and specify the estimated location as a location of the newly added base station.

7. The apparatus of claim 1, wherein the location specification unit is configured to, if it is determined by the determination unit that the base station has been newly added and if location information of the added base station is known, specify the location information as a location of the newly added base station.

8. The apparatus of claim 1, wherein the location specification unit is configured to, if it is determined by the determination unit that the base station has been moved and if location information of the moved base station is not known, specify a location of a base station having a high correlation coefficient, among previously constructed base stations, as a location of the moved base station.

9. The apparatus of claim 1, wherein the location specification unit is configured to, if it is determined by the determination unit that the base station has been moved and if location information of the moved base station is not known, estimate a location of the moved base station using information of a previously constructed location DB, and specify the estimated location as a location of the moved base station.

10. The apparatus of claim 1, wherein the location specification unit is configured to, if it is determined by the determination unit that the base station has been moved and if location information of the moved base station is known, specify the location information as a location of the moved base station.

11. A method for correcting a location of a base station, comprising:
receiving, by a data collection unit, collected data including collection places and scan data acquired from the collection places from a collection-only terminal, and scan data having no collection places from a user service terminal;
obtaining, by a determination unit, correlations between respective base stations based on a number of times each base station in an identical search group is found in a search using the collected data or the scan data;
determining, by the determination unit, whether a base station has been moved, deleted or added, based on the correlations between respective base stations; and
specifying, by a location specification unit, a location of the corresponding base station that has changed due to any one of the movement, deletion, and addition of the base station, based on results of the determination,
wherein the collection-only terminal and the user service terminal are separate terminals that are configured to separately provide their respective data to the data collection unit.

12. The method of claim 11, wherein: the correlations between respective base stations are represented by values of correlation coefficients, and determining comprises determining whether the corresponding base station has been added or deleted, using a change in a value of a corresponding correlation coefficient.

13. The method of claim 11, wherein: the correlations between respective base stations are represented by values of correlation coefficients, and determining comprises determining whether the corresponding base station has been deleted, using both a value of a corresponding correlation coefficient and information about time at which the base station was finally found.

14. The method of claim 11, wherein: the correlations between respective base stations are represented by values of correlation coefficients, and determining comprises determining whether the corresponding base station has been moved, using a configuration of a new identical search group and a change in a value of a corresponding correlation coefficient.

15. The method of claim 11, wherein specifying the location comprises, if it is determined that the base station has been newly added and if location information of the added base station is not known, specifying a location of a base station having a high correlation coefficient, among previously constructed base stations, as a location of the newly added base station.

16. The method of claim 11, wherein specifying the location comprises, if it is determined that the base station has been newly added and if location information of the added base station is not known, estimating a location of the added base station using information of a previously constructed location database (DB), and specifying the estimated location as a location of the newly added base station.

17. The method of claim 11, wherein specifying the location comprises, if it is determined that the base station has been newly added and if location information of the added base station is known, specifying the location information as a location of the newly added base station.

18. The method of claim 11, wherein specifying the location comprises, if it is determined that the base station has been moved and if location information of the moved base station is not known, specifying a location of a base station having a high correlation coefficient, among previously constructed base stations, as a location of the moved base station.

19. The method of claim 11, wherein specifying the location comprises, if it is determined that the base station has been moved and if location information of the moved base station is not known, estimating a location of the moved base station using information of a previously constructed location DB, and specifying the estimated location as a location of the moved base station.

20. The method of claim 11, wherein specifying the location comprises, if it is determined that the base station has been moved and if location information of the moved base station is known, specify the location information as a location of the moved base station.

* * * * *